United States Patent [19]

Hirane

[11] Patent Number: 5,272,306
[45] Date of Patent: Dec. 21, 1993

[54] SPOT WELDING APPARATUS AND METHOD

[76] Inventor: Akio Hirane, 1-16-26 Midorigaoka, Meguro-ku, Tokyo, Japan

[21] Appl. No.: 955,118

[22] Filed: Oct. 1, 1992

[30] Foreign Application Priority Data

Oct. 1, 1991 [JP] Japan .................................. 3-253243

[51] Int. Cl.$^5$ .............................................. B23K 11/24
[52] U.S. Cl. .................................................... 219/110
[58] Field of Search ................... 219/86.41, 86.21, 108, 219/110, 90

[56] References Cited

U.S. PATENT DOCUMENTS

| Re. 29,762 | 9/1978 | Becker | 219/90 |
| 3,462,577 | 8/1969 | Helms et al. | 219/110 |
| 3,538,293 | 11/1970 | Procacino | 219/110 |
| 4,876,430 | 10/1989 | Herschitz et al. | 219/110 |

Primary Examiner—Clifford C. Shaw
Attorney, Agent, or Firm—Allegretti & Witcoff, Ltd.

[57] ABSTRACT

Welding overlapped work pieces in electrical contact with each other, the exposed surface of the lower work piece having an insulating coating. The overlapped work pieces are interposed between opposed first and second electrodes, the second electrode bearing against said coating. Initial current flow to said first electrode activates a circuit which results in heating the work pieces to melt the coating under the second electrode, whereupon current flows between the electrodes to produce a spot weld. Detection means senses the flow of current between the electrodes and sends a signal to a switch to render inoperative the heating circuit. This reduces the heated region extending outwardly from the spot welding area to prevent deterioration in the strength of the welded work pieces because of a change in the quality of the metal. The apparatus also conserves power normally consumed for heating.

8 Claims, 2 Drawing Sheets

SPOT WELDING APPARATUS AND METHOD

The present invention relates to a welding apparatus for spot-welding overlapped articles, at least one of which has a coating on its outer surface, and a spot welding method using said welding apparatus.

THE PRIOR ART

U.S. Pat. No. Re. 29762 discloses a method for welding coated sheet metal panels in which the superimposed panels are interposed between upper and lower electrodes. The lower electrode is insulated from the lower panel by an insulator and a cooling plate, but is connected electrically to the two panels by a cable. Thus the current to the upper electrode flows through the panels to heat the metal and melt the coating. When the coating melts, the panels come into contact and the current flows to the lower electrode through the lower sheet metal panel and weld the two panels together. Since the welding current is not confined to the area of the spot weld the heated region is widened, resulting in reduced strength due to a change in properties of the welded panels.

Applicant's Japanese patent 285482/90 discloses spot welding two superimposed work-pieces using a welding power source having an electrode connected to a positive terminal and a second electrode connected to a negative terminal. Also connected to the negative terminal is a flat plate which is electrically connected to the workpieces by means of a clamp. The exposed surface of the lower of the superimposed work pieces is coated. The work pieces are sandwiched between the opposed electrodes, the lower electrode being in contact with the coating. When the welding current is turned on the work pieces are heated by current passing from the upper electrode through the work piece to clamped flat plate. The heat melts the coating which permits the lower electrode to contact the lower work piece. A surge of current from the upper to the lower electrode spot welds the work pieces together In case of this process, however, even after the current started to flow between the welding electrodes, the welding current keeps flowing from the upper welding electrode tip 29 via the spot welding points 36 to the ground plate to diffuse outwardly from the spot welded zone, so that the welding current between the two welding electrode tips becomes insufficient, thus resulting in an incomplete welding. There is also the disadvantage that the welding time and the welding current are difficult to adjust, and if the welding time is too long, the welding area is perforated. A further disadvantage is that a large amount of heat is generated in a region surrounding the welding area, and thus, a correspondingly increased annealed portion is produced near said region, resulting in a reduced strength of the welded articles and in a difficulty to realize a welding of a homogeneous quality.

THE INVENTION

The object or purpose of the present invention is to solve the above-described problems, that is, to suppress the generation of a heat in a large region in the vicinity of the spot welding area, to prevent a reduction in strength of the welded articles and to allow a uniform and complete welding in each of spot welding points.

To achieve the above object, according to the present invention, there is provided a spot welding apparatus comprising a welding power source; a first cable drawn from one pole of said welding power source; a first welding electrode tip connected to an end of said first cable; second and third cables connected the other pole of said power source; a contact member provided at an end of said second cable, said contact member contact-connecting to portions of metal-exposed surfaces of the articles to be welded which portions are spaced apart from a spot welding area of the overlapped articles to be welded; a second welding electrode tip connected to an end of the said third cable adapted to be mounted on a coated surface of said overlapped articles opposite said first electrode tip, means for detecting the current flowing to said second welding electrode tip; and a switch device for cutting off the current flowing to said contact member in response to the output from said current detecting means.

Further, according to the present invention, there is provided a spot welding method for achieving the above-mentioned object, said method comprising the steps of electrically connecting by contact a first welding electrode tip, which is connected to an end of a cable drawn from one pole of a welding power source, to an upper uncoated surface in a spot welding area of one of overlapped first and second articles to be welded; pressing a second welding electrode tip, which is connected to an end of one of two cables connected to the other pole of said power source against a coating on the outer surface of the other article in an opposed relation to the first welding electrode tip; electrically contact-connecting a contact member to portions of metal exposed surfaces of the articles which portions are spaced apart from the spot welding area, said contact member being provided at an end of the other of said two cables connected to the other pole of said power source; supplying a current from said welding power source so as to flow between said first welding electrode tip and said contact member thermally remove the coating beneath said second welding electrode tip, detecting the current flow between said first and second welding electrode tips; and cutting off the current flowing between said first welding electrode tip and said contact member in accordance with the result of detection of the current flow between said first and second welding electrode tips.

PRACTICE OF THE INVENTION

According to the present invention, a first welding electrode tip connected to an end of a cable drawn from one pole of a welding power source, is electrically connected by contact to a metal portion of the upper surface of a spot welding area. The metal portions of overlapped articles or workpieces which are in contact with the first electrode and the contact member are exposed by abrasion or the like, to provide good electrical contact. The contact member mounted on the end of the other of the two cables is connected by a clamp to abraded regions spaced apart from the spot welding area of the articles to be welded. With the electrodes and contact member in place a current is supplied from the welding power source so as to flow between the first welding electrode tip and the contact member, thus causing the lower portion of the first welding electrode tip to be heated. The heat flows to the lower article or workpiece to soften, melt or evaporate the coating thereon directly beneath said first welding electrode tip. This causes the opposed second welding electrode tip pressed against the outer surface of the coating to be brought into contact and, accordingly, electric connection with the thus exposed metal surface of said lower article, so that the current flows freely from the first welding electrode tip to the second welding electrode tip, current flowing to the second welding electrode tip is detected by a relay coil which is connected to a switch which cuts off, the current flowing from the first welding electrode tip to the contact member. This permits the main welding current flow to be confined to the small the spot welding area between the first and second welding electrode tips. Therefore, surrounding heat-emitting area is reduced, resulting in a reduction in electric power loss, and at the same time, any change or deterioration in quality of the spot weld due to the change in distance between the first welding electrode tip and the contact member is prevented. In a preferred form of the invention a timing circuit may be provided in the current path leading to the second electrode to regulate the time of current flow to the second welding electrode tip, and to provide a sound weld and preclude perforation of the workpieces.

BRIEF DESCRIPTION OF THE DRAWINGS

Specific embodiments of the invention are illustrated in the appended drawings in which

Referring to FIG. 1, a plus cable 27 is connected to a plus terminal of a welding power source, and a first welding electrode tip 29 is attached to an end of the first cable 27 and electrically connected, by pressure contact, to a metal exposed surface of an article or workpiece 35 to be welded. It should be noted that, if there is a coating, such as a paint coating, on either side of such coatings must be previously removed. Second and third cables 30a and 30b are separately connected to minus terminals of the welding power source, or a primary cable may be divided into two branch cables 30a and 30b. A contact clamp 31 on the leading end of the cable 30a is electrically connected by contact to a metal-exposed portion of one or both of the articles 34, and 35 at a point relatively far from the spot welding area. Article 34, having a coating 34a on its underside, is overlapped with article 35 in welding position. A second welding electrode tip 33 on the leading end of cable 30b is pressed against a coating 34a on the article 34 in an opposed relation to the first welding electrode tip 29. A relay coil 40 is provided in the electric current path of the cable 30b, and a switch 41 operatively associated with the relay coil 40 is provided in the electric current path of the cable 30a.

Figure 1:
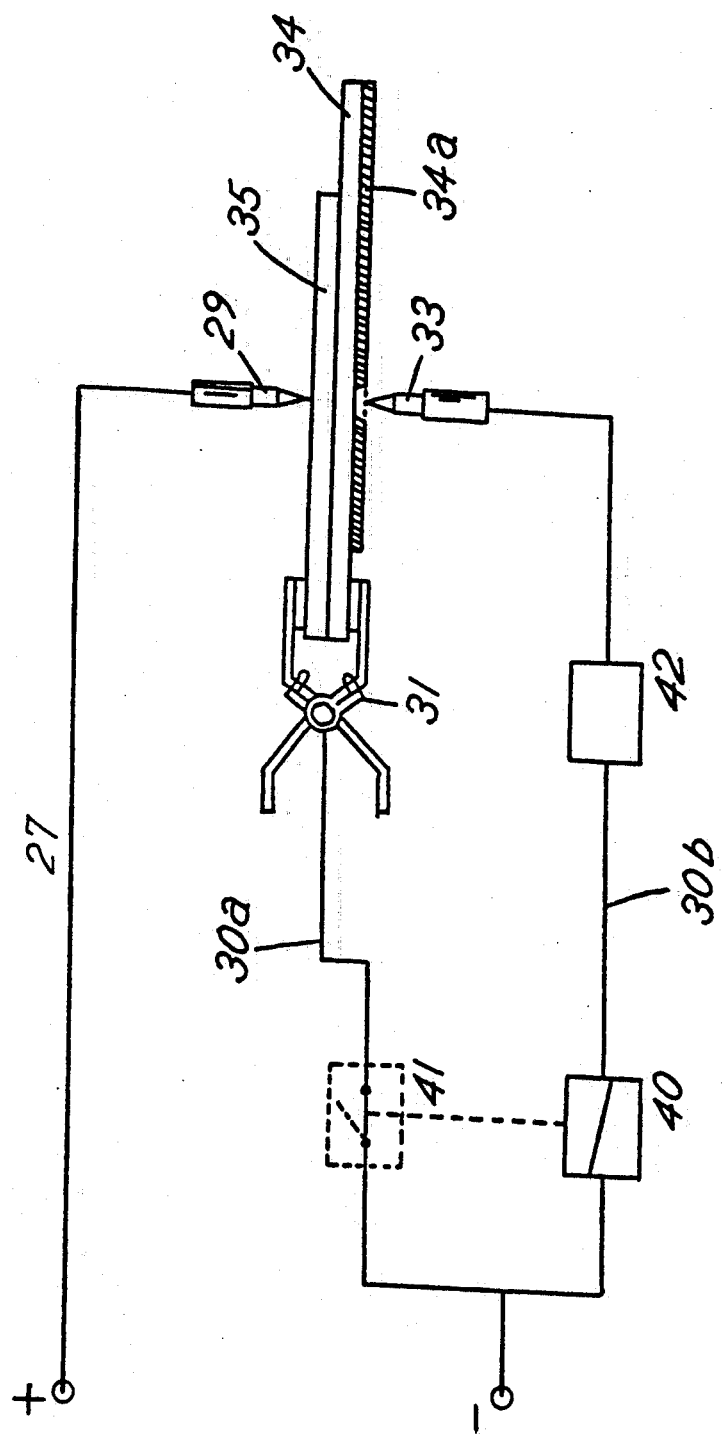
FIG. 1 is a schematic circuit diagram showing a spot welding apparatus in accordance with the invention.

A preheating current flows from the plus pole of the welding power source to the minus pole of the welding power source via the cable 27, and the first welding electrode tip 29, articles 35, 34, clamp 31 and cable 30a including normally closed switch 41. Due to this preheating current, the spot-welding region near the point at which the first welding electrode tip is press-contacted with article 35 is heated. The heat softens, melts or evaporates the coating such as a paint coating on the portion of the article 34 with which the second welding electrode tip 33 is in contact. When the second welding electrode tip 33 is brought into contact and, accordingly, electrical connection with the metal surface of the article 34, the current flows through a relay coil 40 provided in the current path leading from the second welding electrode tip 33, the relay coil 40 is energized to cause the associated switch 41 to be opened to the position shown by a broken line in FIG. 1. As a result, the welding current flows only between the first and second welding electrode tips 29 and 33. A timing circuit 42 comprising, e.g. a time switch is provided in cable 30b to ensure that the current flows through electrode 29, 33 used for the main welding flows only for a predetermined period of time. The main welding time can always be kept constant by adjusting the setting of the energization time of the timing circuit, thereby effecting a uniform and firm welding with high efficiency. During this main welding process, no preheating current flows due to the opening of the contact 41, and hence, the area of the heated region spreading from the main spot welding area can be minimized, thus resulting in a reduction in electric power loss.

Figure 2:
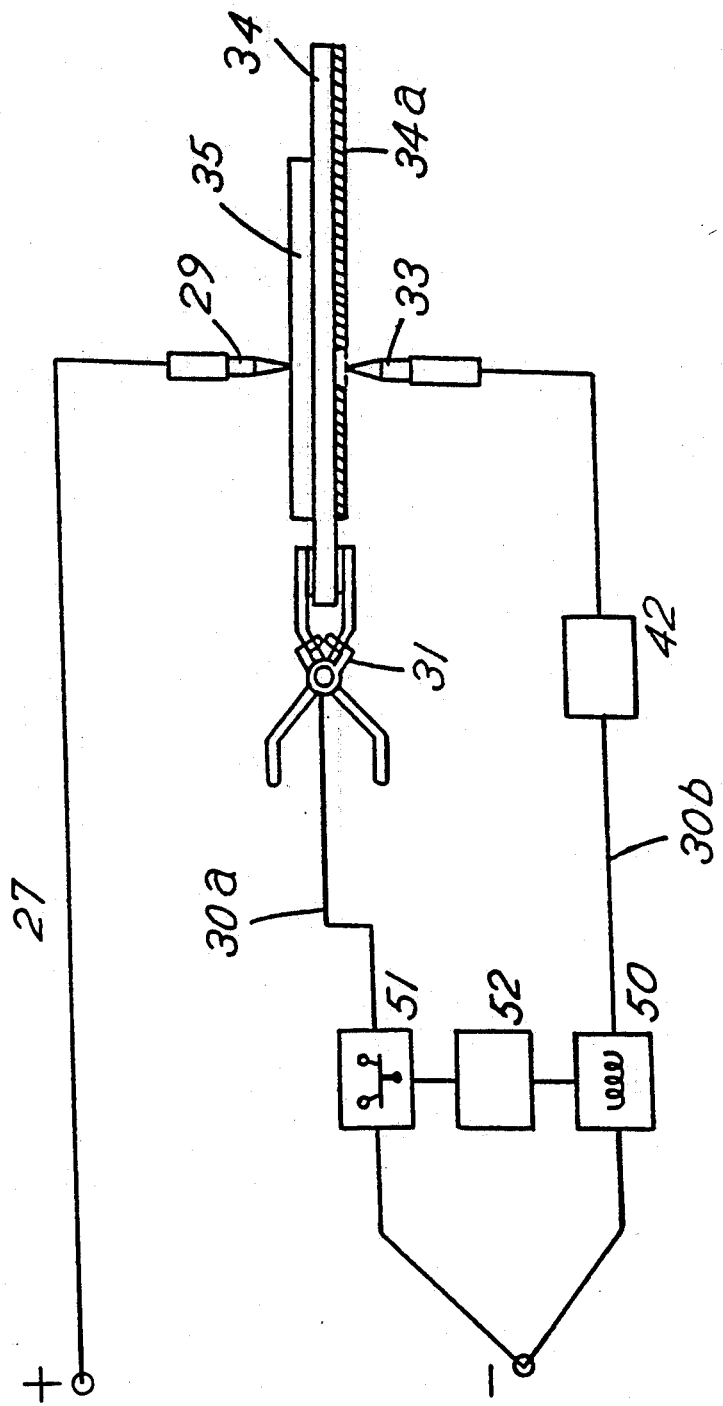
FIG. 2 is a similar diagram showing an alternative structure including modified circuitry.

In the further embodiment shown in FIG. 2, a current detecting coil 50 is provided around the cable 30b for detecting the flow of current through the cable 30b. The output signal from said current detecting coil 50 is amplified and processed in a control circuit 52, and then actuates a switching transistor 51 provided in the current path of the cable 30a to arrest current flow through cable 30a. The switching transistor 51 can be comprised of a bi-polar power transistor, a power MOSFET or an electrostatic induction type transistor. Further, in place of the switching transistor, a semiconductor switch such as a thyristor, a GTO thyristor, or an electrostatic induction type thyristor can alternatively be used.

In addition, as the current detecting means, a current transformer may be connected in the current path of the cable 30b, so that the secondary coil current thereof is processed by the control circuit 52 to control the gate of a thyristor or the base of a transistor. A Hall element may be used as a further alternative current detecting means.

Although the number of the cables connected to the minus pole of the welding power source is two in the above-described embodiments, the apparatus can alternatively be constructed such that the cable 27 is connected to the minus side of the welding power source, and the cables 30a and 30b are connected to the plus side of the welding power source. Moreover, AC power source may be employed as the welding power source, in which case the cable 27 is connected to one terminal of the AC power source, while the cables 30a and 30b are connected to the other terminal.

According to the present invention, the welding current first flows between the first welding electrode tip and the contact member through the articles to be welded, so that the region near the area where the first welding electrode tip is contacted with the article to be welded is preheated, thereby causing the softening, melting or vaporising of the coating such as a paint coating on the article 34. As a result, the second welding electrode tip is brought into contact and, accordingly, electrical connection with said article, so that the current starts to flow between the first and second welding electrode tips. Current flow through cable 30b triggers the switch in cable 30a to arrest the current flow between the first welding electrode tip 29 and the contact member 31. Thus, all the current is used to weld together the overlapped work pieces. Narrowing the heated region assures a homogeneous quality of the welds, a reduction in electric power loss and increased welding capability.

I claim:

1. A spot welding apparatus comprising
a welding power source having two poles,
a first cable drawn from one pole of said welding power source,
a first welding electrode tip connected to an end of said first cable adapted to be mounted at a spot welding area on overlapped articles to be welded,
a second and a third cable connected to the other pole of said power source,
a contact member provided at the end of said second cable to electrically connect to portions of metal-exposed surfaces of said articles, said surface portions being spaced apart from said spot welding area,
a second welding electrode tip connected to an end of said third cable adapted to be mounted on a coated surface of said overlapped articles opposite said first welding electrode tip,
means on said third cable for detecting the current flowing from said first welding electrode tip, through said overlapped articles to said second welding electrode tip, and
a device on said second cable electrically connected to said current detecting means for cutting off the current flowing to said contact member in response to the output from said current-detecting means.

2. The spot welding apparatus according to claim 1, wherein said current detecting means is a relay coil, and said current cutting-off device is a switch.

3. The spot welding apparatus according to claim 1, wherein said current detecting means is a coil surrounding said third cable, and said current-cutting-off device is a switch, whereby the output from said coil is used for turning off said switch through a control circuit.

4. The spot welding apparatus according to claim 1, wherein said current detecting device is a Hall element.

5. The spot welding apparatus according to claim 1, wherein said cutting-off device is a bi-polar power transistor, a power MOSFET, a thyristor, a GTO thyristor, an electrostatic induction type transistor, or an electrostatic induction type thyristor.

6. The spot welding apparatus according to claim 1, which includes a timing circuit in the current path leading to said second welding electrode tip, to regulate the time of current flow to said second welding electrode tip.

7. A method for spot welding two flat metal work pieces, one of said work pieces having an insulating coating on one surface thereof, the other work piece being uncoated, comprising
overlapping said work pieces with said insulating layer exposed,
providing a spot welding power source having a first electrode connected to one pole of one said power source, a second electrode connected to the other pole of said power source, and a contact member also connected to the other pole of said power source,
placing said first electrode in contact with a spot welding area on an uncoated surface of said overlapped work pieces,
placing said second electrode in contact with said insulating coating opposed to said first electrode,
connecting said contact member to an uncoated surface of said overlapped work pieces at a point remote from said spot welding area,
passing an electric current from said power source through said first electrode and through said overlapped work pieces to said contact member, thereby thermally removing said coating in said spot welding area to permit said second electrode to make contact with the metal work piece, and initiate current flow from said first to said second electrode,
detecting the current flow from said second electrode,
arresting current flow to said contact member in response to said detection, and
continuing to supply current to said first electrode to completely spot weld said work pieces in said spot welding area without adversely affecting the quality of the work pieces in the area surrounding said spot welding area.

8. The method of claim 7 in which said continued supply of current is limited in time to prevent perforation of the workpieces.

* * * * *